(12) United States Patent
Claudel et al.

(10) Patent No.: US 9,650,152 B2
(45) Date of Patent: May 16, 2017

(54) FLIGHT ENVELOPE PROTECTION SYSTEM FOR UNMANNED AERIAL VEHICLES

(71) Applicant: King Abdullah University of Science and Technology, Thuwal (SA)

(72) Inventors: Christian Claudel, Thuwal (SA); Mohammad Shaqura, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/921,617

(22) Filed: Oct. 23, 2015

(65) Prior Publication Data

US 2016/0114903 A1    Apr. 28, 2016

Related U.S. Application Data

(60) Provisional application No. 62/068,199, filed on Oct. 24, 2014.

(51) Int. Cl.
*B64D 45/00* (2006.01)
*B64C 39/02* (2006.01)
(Continued)

(52) U.S. Cl.
CPC ............ *B64D 45/00* (2013.01); *B64C 39/024* (2013.01); *G05B 13/027* (2013.01);
(Continued)

(58) Field of Classification Search
CPC .... B64D 45/00; G05B 13/027; G05D 1/0055; G06N 99/005; B64C 39/024; B64C 2201/146
See application file for complete search history.

(56) References Cited

U.S. PATENT DOCUMENTS 6,273,370 B1 *   8/2001   Colgren ................ G01C 21/16
                                                244/181
6,332,105 B1    12/2001   Calise et al.
(Continued)

OTHER PUBLICATIONS

Rohit Pandita et al: "Reachability and 1-12 Region of Attraction Analysis Applied to GTM Dynamic Flight Envelope Assessment", AIAA Guidance, Navigation, and Control Conference, Aug. 10, 2009 (Aug. 10, 2009), XP055257716, Reston, Virigina DOI: 10.2514/6.2009-6258 ISBN: 978-1-60086-978-5.
(Continued)

*Primary Examiner* — Michael J Zanelli
(74) *Attorney, Agent, or Firm* — Thomas | Horstemeyer, LLP

(57) ABSTRACT

Systems and methods to protect the flight envelope in both manual flight and flight by a commercial autopilot are provided. A system can comprise: an inertial measurement unit (IMU); a computing device in data communication with the IMU; an application executable by the computing device comprising: logic that estimates an angle of attack; a slip angle; and a speed of an unmanned aerial vehicle (UAV) based at least in part on data received from the UAV. A method can comprise estimating, via a computing device, flight data of a UAV based at least in part on data received from an IMU; comparing the estimated flight data with measured flight data; and triggering an error indication in response to a determination that the measured flight data exceeds a predefined deviation of the estimated flight data. The estimated speed can comprise an estimated airspeed, vertical speed and/or ground velocity.

20 Claims, 7 Drawing Sheets

(51) Int. Cl.
*G05B 13/02* (2006.01)
*G05D 1/08* (2006.01)
*G06N 7/00* (2006.01)

(52) U.S. Cl.
CPC ...... *G05D 1/0833* (2013.01); *B64C 2201/146* (2013.01); *G06N 7/005* (2013.01)

(56) References Cited

U.S. PATENT DOCUMENTS

| | | | | |
|---|---|---|---|---|
| 6,928,341 | B2* | 8/2005 | Wise | G01P 13/025 244/181 |
| 2004/0044444 | A1* | 3/2004 | Johnson | G05D 1/101 701/3 |
| 2009/0316755 | A1* | 12/2009 | Collette | G05D 1/0044 375/133 |
| 2011/0295569 | A1* | 12/2011 | Hamke | G01P 7/00 703/2 |
| 2013/0311011 | A1* | 11/2013 | Malta | B64C 5/02 701/3 |

OTHER PUBLICATIONS

International Search Report and Written Opinion of Application No. PCT/IB2015/002562 mailed Mar. 22, 2016.

* cited by examiner

FLIGHT ENVELOPE PROTECTION SYSTEM FOR UNMANNED AERIAL VEHICLES

CROSS-REFERENCE TO RELATED APPLICATION

This application claims the benefit of and priority to U.S. Provisional Application Ser. No. 62/068,199, having the title "FLIGHT ENVELOPE PROTECTION SYSTEM FOR UNMANNED AERIAL VEHICLES," filed on Oct. 24, 2014, the disclosure of which is incorporated herein in by reference in its entirety.

CROSS-REFERENCE TO RELATED DOCUMENTS

This application makes reference to and incorporates by reference the following papers as if they were fully set forth herein expressly in its entirety: Bayesian Estimation Of Airspeed, Angle of Attack and Sideslip In Unmanned Aerial Vehicles Using A Hybrid System Approach, attached hereto as Appendix A, and An Hybrid Systems Approach to Real-Time Air Data Estimation in Unmanned Aerial Vehicles, attached hereto as Appendix B.

TECHNICAL FIELD

The present disclosure generally relates to operation of unmanned aerial vehicles (UAVs).

BACKGROUND

Fixed wing Unmanned Aerial Vehicles (UAVs) are an increasingly common sensing platform, owing to their key advantages: speed, endurance and ability to explore remote areas. While these platforms are highly efficient, they cannot easily be equipped with air data sensors commonly found on their larger scale manned counterparts. Indeed, such sensors are bulky and expensive. They can severely reduce the payload capability of the UAVs. In consequence, UAV controllers (humans or autopilots) have little information on the actual mode of operation of the wing (normal, stalled, spin) which can cause catastrophic losses of control when flying in turbulent weather conditions. Because of their relatively small scale, wind turbulence has a much larger effect on small UAVs than on larger aircrafts.

Additionally, one of the biggest issues arising with the operation of UAVs (including remote controlled airplanes) is the need for extensive training of the pilots. While autopilots could theoretically fly the UAVs, the small size and low cost of UAVs makes these autopilots relatively simple. These autopilots are, for example, unable to avoid or detect an aerodynamic stall and react accordingly, leading to a high number of crashes. In consequence, humans or autopilots do not typically fly UAVs at the edge of the flight envelope in order to keep a high safety margin. This can reduce the performance of the UAV (turn radius, slow speed flight) compared to its maximal possible performance.

Accordingly, there is a need to address the aforementioned deficiencies and inadequacies.

SUMMARY

The present system is compatible with both manual flight and flight by a commercial autopilot, and equally protects the flight envelope in both cases. The present system allows the autopilot or human operator to safely explore the full extent of the flight envelope of the UAV during its operation, providing safety guarantees (stall avoidance for example). While such flight envelope protections could be achieved using dedicated air sensors (pitot tubes, sideslip and angle of attack sensors), such as in the Airbus A3XX series (A320, A330, A340, A350 and A380) or in the Boeing 777, 787 and 737NG), these sensors are 1) expensive compared to the cost of an UAV or remote controlled airplane; 2) bulky and heavy compared to the size and mass of the UAV or remote controlled airplane; and 3) difficult to install in a small UAV or small remote controlled airplane. Therefore, these sensors are impractical for smaller UAVs. Instead, we provide a low cost (since, in various aspects, it may only require an accelerometer/IMU/magnetometer combo), easy to install solution. In various aspects the solution can be provided at the interface of the transceiver and actuators, or autopilot and actuators if the UAV flies in autopilot.

The present system can provide a real-time air parameter estimation scheme that can run on commercial, low power autopilots in real-time. The computational method can be based on a hybrid decomposition of the modes of operation of the UAV. The computational method can also be based on a Bayesian approach for estimation, in which the estimated speed, angle of attack and sideslip can be described statistically.

In various aspects, the present system does not rely on dedicated airflow sensors (for example, pitot tube, angle of attack/sideslip sensors). In various aspects, the present system can use only an inertial measurement unit (IMU), such as one or more accelerometers or gyroscopes for estimation. In some embodiments, microelectromechanical systems (MEMS) may be used, such as MEMS accelerometers and/or MEMS gyroscopes. All other approaches need more complex technology, requiring additional sensors above the sensors mentioned above. In various aspects, the estimation of speed, angle of attack and sideslip can be done using a hybrid systems approach, which is more computationally efficient and responsive than classical Kalman Filtering approaches (which are traditionally used for air parameter estimation). The estimation of speed can include one or more of an estimation of airspeed, vertical speed, or ground velocity.

The present system can be useful to toy R/C airplane manufacturing companies (for example, to manufacture easier-safer RC aircrafts). For example, current (2014) solutions for increasing safety of R/C toy airplanes are based on the stabilization of pitch and roll angles to zero (panic button). This, however, does not prevent or solve the problem of aerodynamic stalls, spins, over accelerations and overspeeds. The present system can also be useful to UAV manufacturing companies.

The present system can also be useful as a secondary system for manned aerial vehicles, such as single engine fixed wing aircraft and/or commercial aircraft such as models manufactured by Airbus, Boeing, and other airplane manufactures. In such embodiments, the present system can be installed to calculate speed (for example, airspeed, vertical speed and/or ground velocity), angle of attack, and angle of sideslip independently from the primary systems installed in the aircraft. If the measurements of the two systems differ by more than a pre-determined margin of error, then one or both of the systems is experiencing an error condition or has failed.

In various aspects, the present disclosure provides an aeronautical system, comprising: an inertial measurement unit (IMU) attached to an unmanned aerial vehicle (UAV); a computing device in data communication with the IMU; an application executable by the computing device, wherein the application comprises: logic that estimates an angle of attack of the UAV based at least in part on data received from the IMU; logic that estimates a slip angle of the UAV based at least in part on the data received from the IMU; and logic that estimates a speed of the UAV based at least in part on the data received from the UAV. In any one or more embodiments, the application can comprise logic that estimates an airspeed, a vertical speed or a ground velocity of the UAV. The application can further comprise logic that causes one or more of the estimated angle of attack, the estimated slip angle, and the estimated speed to be rendered within a user interface displayed to a pilot of the UAV. In any one or more embodiments, the application estimates at least one of the angle of attack, the slip angle, or the speed using a least mean squares approach. In any one or more embodiments, the application estimates at least one of the angle of attack, the slip angle, or the speed using a Bayesian filter approach. The application can further comprise logic that synthesizes a flight path vector for the UAV from an estimated ground velocity, that can be rendered within a user interface displayed to a pilot of the UAV.

In various aspects, the present disclosure provides a method, comprising estimating, via a computing device, flight data of an unmanned aerial vehicle (UAV) based at least in part on data received by the computing device from an inertial measurement unit (IMU); comparing, via the computing device, the estimated flight data of the UAV with measured flight data of the UAV to determine whether the measured flight data of the UAV is within a predefined deviation of the estimated flight data of the UAV, wherein the measured flight data is reported by a dedicated sensor; and triggering, via the computing device, an error indication in response to a determination that the measured flight data of the UAV exceeds a predefined deviation of the estimated flight data of the UAV. In some embodiments, the estimated flight data comprises at least one of an angle of attack of the UAV, a slip angle of the UAV, or a speed of the UAV. The estimated speed of the UAV can comprise an estimated airspeed of the UAV, an estimated vertical speed of the UAV and/or an estimated ground velocity of the UAV. The estimated ground velocity can be used to synthesize a flight path vector for the UAV. In some embodiments, the estimated flight data is estimated using a least mean squares approach. In some embodiments, the estimated flight data is estimated using a Bayesian filter approach.

Other systems, methods, features, and advantages of the present disclosure for a will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
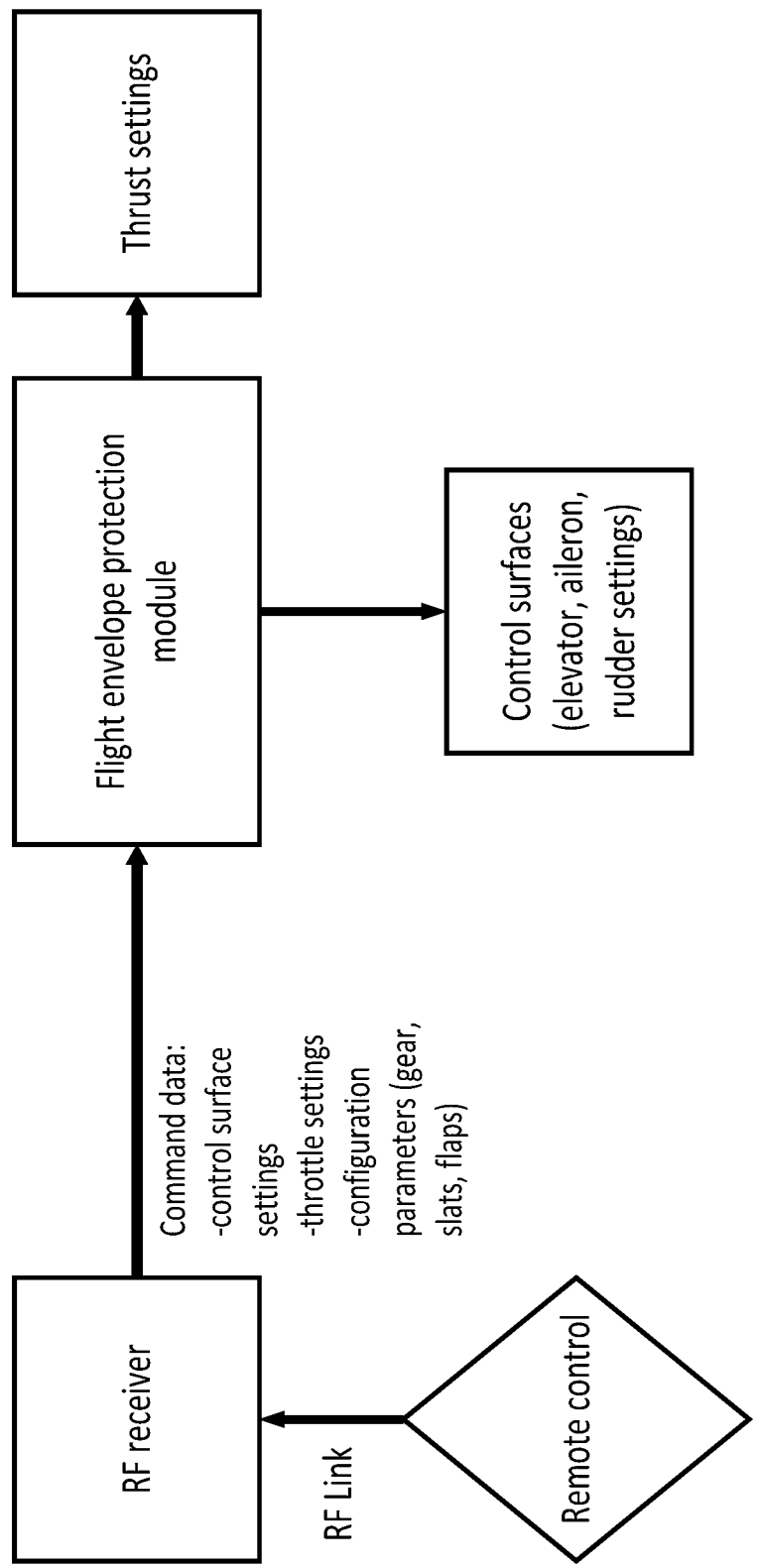
FIG. 1 depicts an embodiment of the present system for the case of manual flight (with remote control).

Described below are various embodiments of the present systems and methods for a nanowire fabrication device. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It should be emphasized that the embodiments described herein are merely examples of possible implementations. Many variations and modifications may be made to the embodiments described herein without departing from the principles of the present disclosure. All such modifications and variations are intended to be included herein within the scope of this disclosure and protected by the claims.

It should also be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Unmanned Aerial Vehicles (UAVs) have been increasingly used for remote monitoring and surveillance applications. Fixed-wing UAVs are considered the fastest and most energy efficient among all types of UAVs. UAVs are used rapidly in harsh environmental applications, typically operating in environment where the presence of humans is costly or dangerous [5, 6]. Due to their activities, UAV systems should be designed to withstand operations in such conditions with robust low-level control schemes. Unfortunately, air parameter sensors fitted in commercial aircraft or large UAVs are done using air data probes which are too bulky, too heavy and too expensive for small UAVs [11]. Even if these systems are fitted, their failure can be catastrophic, causing partial loss of control or crashes of fixed-wing airplanes as well as UAVs. Knowledge of air data can aid the UAV operator or the autopilot to explore the full flight domain and to avoid or recover from possible stalls or spins. This requires that these air data parameters be estimated. Critically, these air data parameters (angle of attack, sideslip and airspeed) have to be estimated in real-time efficiently. The estimation can be limited by computational power, accuracy, and the need of failure prone sensors.

Several articles have been written to discuss estimation methods of airspeed, angle of attack and side slip angle. In [16, 9], Extended Kalman filters and LQR based estimators are discussed. These methods can be accurate but require significant computational resources to compute the required matrices. Analytical reconstruction of angle of attack using filtering and fusion has been discussed [20]. Another approach for the angle of attack and angle of sideslip estimation is to reconstruct them from inertial sensor data. This method is adversely affected by the bias in accelerometer and gyroscope measurements and, therefore, requires further analysis to be done in frequency domain [18] under a small biases assumption. Hybrid approaches have been widely used in the context of estimation. The method of sub-systems has been discussed [10]. The system is split into smaller sub-system modules where the parameter estimation is done on every module which lowers the computational cost while maintaining accuracy.

In various aspects, the present disclosure provides a system applicable to fixed wing unmanned aerial vehicles (UAVs), including remote controlled airplanes. The system can interface between a radio receiver of an unmanned aerial vehicle (or the output of its autopilot) and UAV actuators, including control surfaces and propulsive engines/motors. The system can prevent loss of control of fixed wing unmanned aerial vehicles, including: aerodynamic stall (upright); inverted stall; overspeed; over-acceleration (which can lead to structural failure); and aerodynamic spin. The system does not prevent controlled crashes with the ground, though it can prevent loss of control of the UAV.

An embodiment of the system is illustrated in FIG. 1 for the case of manual flight (with a remote control). As illustrated, a remote control is in data communication via a radio frequency (RF) link with an RF receiver attached to the UAV. Command data for the UAV, such as control surface settings, throttle settings, and/or other configuration parameters may be sent from the remote control to the RF receiver. This command data is then forwarded by the RF receiver to the flight envelope protection module. Based at least in part on the command data, the flight envelope protection module adjusts the control surfaces of the UAV, such as the elevator, aileron, and/or rudder settings, as well as the thrust settings.

Figure 2:
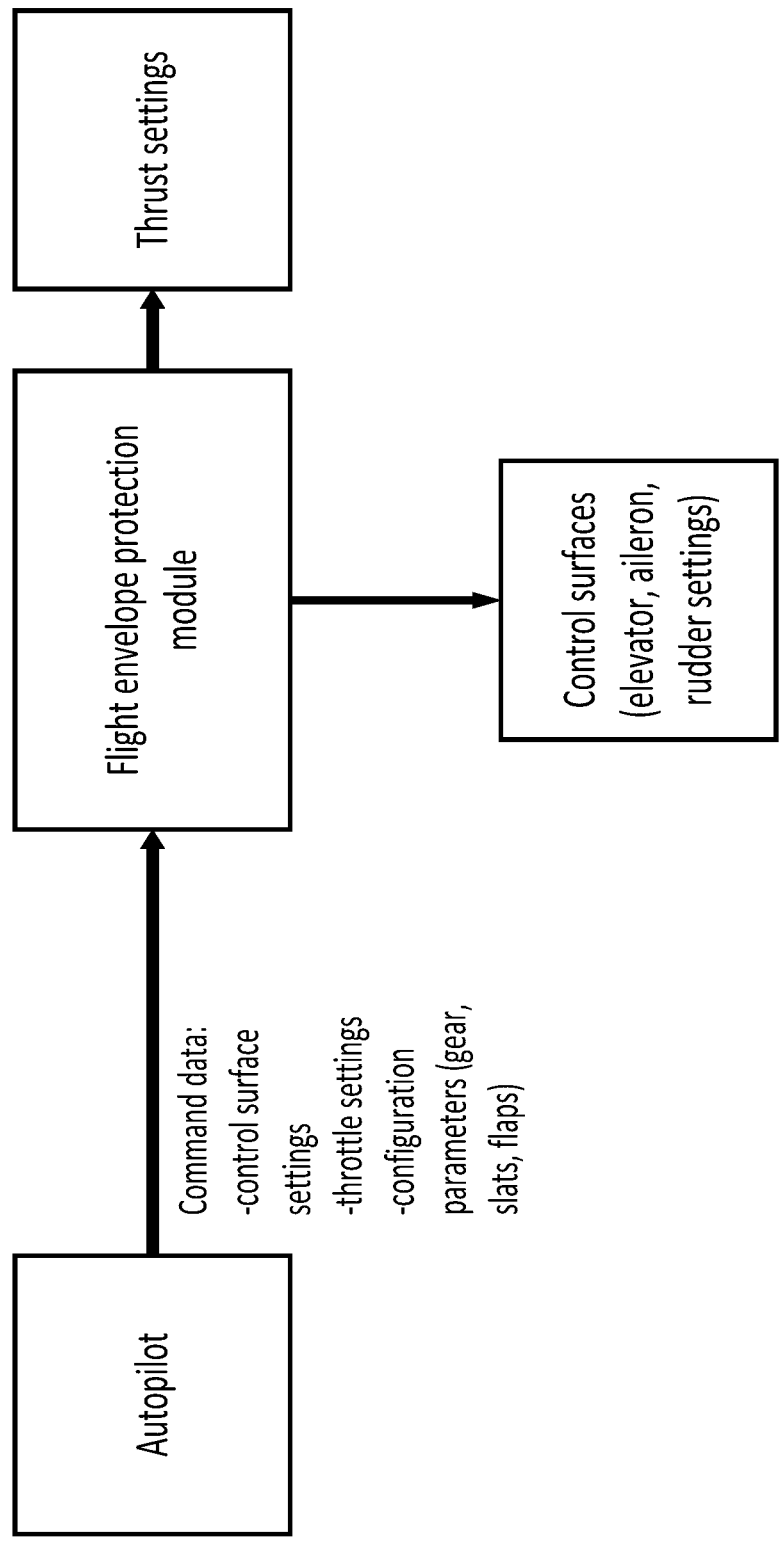
FIG. 2 depicts an embodiment of the present system for the case of auto flight (with an on onboard autopilot).

FIG. 2 depicts an embodiment of the present system in the context of automated flight by a UAV (with an onboard autopilot). The autopilot is in data communication with the flight envelope protection module. The autopilot determines the necessary settings for the UAV to pursue a previously defined or specified flight path. The autopilot then sends command data such as control surface settings, throttle settings, and/or other configuration parameters, to the flight envelope protection module. Based at least in part on the command data, the flight envelope protection module adjusts the control surfaces of the UAV, such as the elevator, aileron, and/or rudder settings, as well as the thrust settings.

The flight envelope protection module depicted in FIG. 1 and FIG. 2 can consist of two sub-systems. One sub-system can estimate the angle of attack, speed and sideslip from the command data sent through the RF receiver (or from the autopilot if the UAV is in auto mode) as well as its inertial measurements (angular rates and accelerations). The estimation of the speed of the UAV can include one or more of an estimation of an airspeed, a vertical speed, or a ground velocity. The estimation of ground velocity can be used to synthesize a flight path vector for the UAV. The second sub-system can compute and send the controls to apply to the control surfaces and engines/motors to maximize control authority (from the human controller or autopilot) while protecting the UAV in angle of attack (maintaining the angle of attack between two threshold values [a,b], where a and b are respectively the angles of onset of inverted stall and stall), maintaining the speed below the maximal speed c, and maintaining the sideslip between threshold values if the angle of attack is in [e,f], where a<e and f<b are configurable angles. The parameters a,b,c,e, and f are a function of the configuration of the UAV (flaps, gear settings), and can be set once for all for a given UAV airframe.

Figure 3:
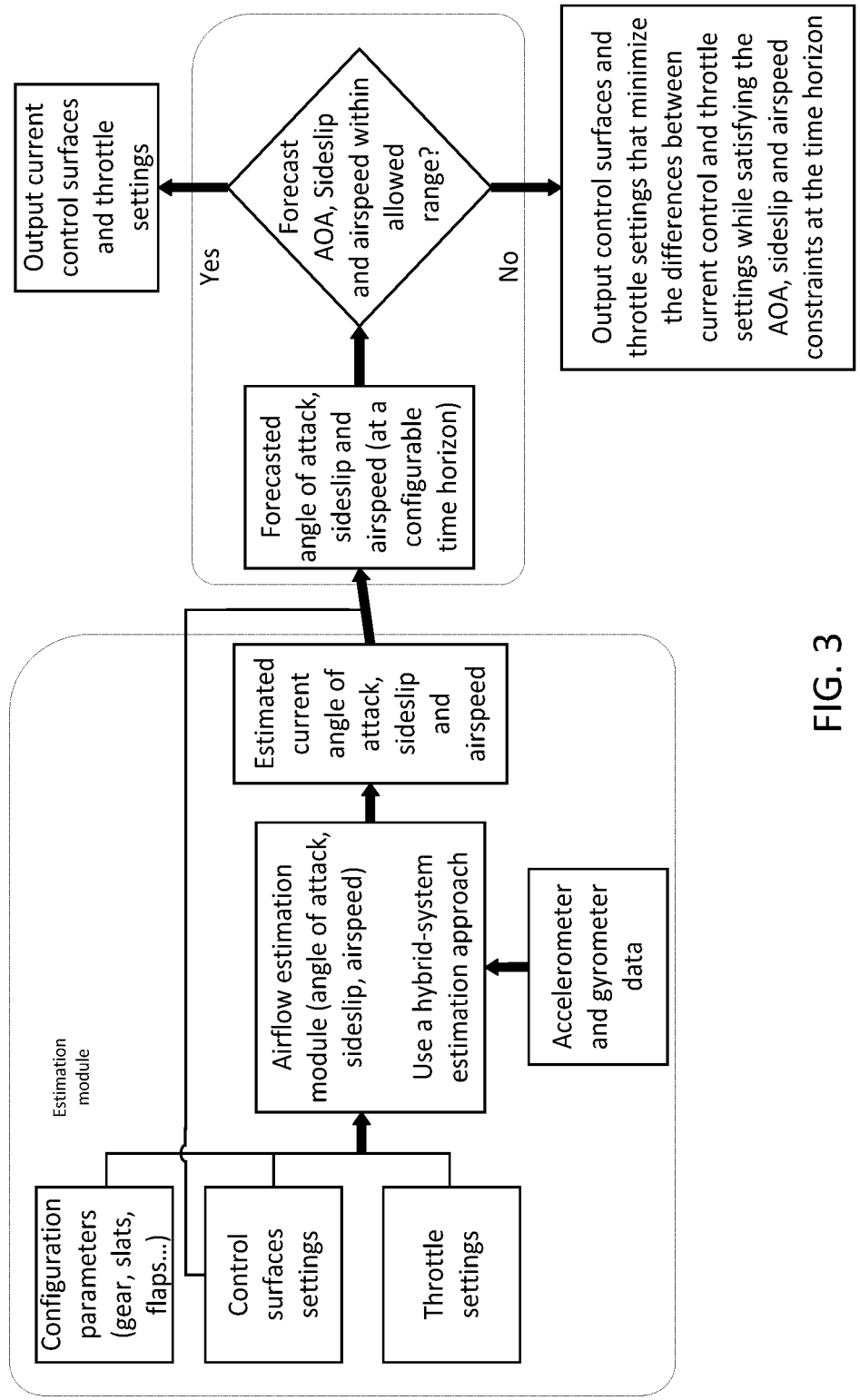
FIG. 3 depicts an embodiment of a flight envelope protection module of the present disclosure.

An embodiment of a flight envelope protection module of the present disclosure is illustrated in FIG. 3. The estimation module receives a number of command parameters for operation of the UAV. The estimation module further receives inertial data from one or more accelerometers and/or gyroscopes. The one or more accelerometers and/or gyroscopes can be part of or included in an inertial measurement unit (IMU). An IMU is an electronic device that can measure and report a craft's velocity, orientation and gravitational forces, using a combination of accelerometers and gyroscopes, sometimes also magnetometers. One or more additional sensors such as one or more positioning devices, for example one or more GPS devices or other positioning devices, can be included to derive or obtain data (for example positioning data) for estimation of vertical speed or ground velocity.

The estimation module then predicts the angle of attack, slip angle for side slip or forward slip, and speed of the UAV if these command parameters were to be applied to the UAV. The estimation module also estimates the current angle of attack, slip angle, and speed of the UAV based at least in part on data from one or more accelerometers and/or gyroscopes. The estimation module may estimate the angle of attack, slip angle, and speed as described above using one or more approaches described in further detail herein. The current and predicted angles of attack, slip angles, and speeds are forwarded to a control module. The control module determines whether the predicted angle of attack, slip angle, and speed that would result from the commands received by the flight envelope protection module are within allowed ranges. As an illustrative and non-limiting example, the predicted angle of attack might result in the UAV stalling and at the current and/or predicted air speed and therefore would be out of the allowed range. If the flight envelope protection module determines that the predicted angle of attack, slip angle, and air speed are within acceptable ranges, the command parameters received by the flight envelope protection module are applied to the control surfaces of the UAV. Otherwise, the flight envelope protection system modifies the command parameters to be within ranges that would result in the safe operation and/or flight of the UAV, and the modified command parameters are then applied to the control surfaces of the UAV.

In various aspects, the proposed system can be based on the decomposition of the non-linear dynamical model of the UAV (nonlinear in both the angle of attack $\alpha$ and the angle of sideslip $\beta$) into a finite set of linear modes that are easier to handle than with typical gradient based optimization methods [8]. The linear modes can be selected based on the characteristics of the aerodynamical response of the UAV to a given angle of attack and angle of sideslip to ensure that the aerodynamical forces and moments are linear in the angle of attack and sideslip over domain of definition of the mode. This can result in a finite number of linear estimation problems (for example, one for each linear mode). A mode selection algorithm can be provided to choose the correct mode based on multiple stages of filtering.

In various aspects, two approaches are presented for the estimation, using either 1) linear least squares or 2) Bayesian filtering. For both approaches, an analytical expression of the speed can be computed offline. The speed can be one or more of an airspeed, a vertical speed, or a ground velocity. Thus, for example, the estimated airspeed associated with each mode can be computed by direct substitution. After the selection of the right mode, estimated $\alpha$ and $\beta$ can be used to update airspeed estimation. In the least squares approach, the estimation of $\alpha$ and $\beta$ boils down to solving a finite number of linear least square problems. This method is extremely fast, since the least squares solution matrices are only a function of the dynamical model, and therefore can be pre-computed offline.

In the Bayesian approach, we can take into account the noise in the measurement data from the Inertial Measurement Unit (IMU). It can offer more accurate results by taking into account sensor noise. Bayesian estimators for hybrid systems have been considered in multiple articles, for a broad range of systems [13], [12], [14]. Though slower than the previously described approach, the Bayesian framework can provide a more accurate estimation and a regularization of the solutions. Below, we show that the Bayesian approach can boil down to matrix multiplication, summation and simple matrix inversion since a large part of the computations can be done offline. The method can result in accurate estimation of airspeed $V_a$ (and/or vertical speed or ground velocity), angle of attack $\alpha$ and angle of sideslip $\beta$ while using limited embedded computational resources.

Provided below is an exemplary hybrid system modeling and formulation. Also discussed are theoretical aspects of an exemplary airspeed analytic formulation, the least squares (LSQR) approach and the Bayesian approach for estimation. The present methods are validated using both Hardware in the Loop (HIL) simulation and experimental flight data.

Hybrid System Modeling

Forces and Moments

Assuming that a fixed wing UAV is a rigid body, we can model it using a 6-degrees of freedom (6-DoF) dynamical model. These equations relate inertial measurements (acceleration and angular acceleration) to control inputs and to the airflow parameters to be estimated. These relations are non linear in terms of the angle of attack $\alpha$, angle of sideslip $\beta$ and airspeed $V_a$.

The total body forces in body frame (attached to the UAV) are expressed by the following equation:

$$m(a_x+rv-qw)=F_{AX}+F_{GX}+F_{throttle}$$
$$m(a_y-ru+pw)=F_{AY}+F_{GY}$$
$$m(a_z+qu-pv)=F_{AZ}+F_{GZ} \quad (1)$$

Where ax, ay, az represent the body accelerations in three directions, u, v, w are the body velocities in the x, y, z directions respectively, p, q, r are the angular velocities in the body frame, $F_{throttle}$ represent the propulsive force generated by the engines, $F_{AX}$, $F_{AY}$, $F_{AZ}$ are the aerodynamical forces acting on the UAV and $F_{GX}$, $F_{GY}$, $F_{GZ}$ are the three components of the gravitational force expressed in body frame. The total body torques are given by:

$$\begin{aligned} I_x \dot{p} - I_{xz}(\dot{r} + pq) + (I_x - I_y)qr &= L_A \\ I_y \dot{q} + (I_x - I_z)pr + I_{xz}(p^2 - r^2) &= M_A + T_{throttle} \\ I_z \dot{r} - I_{xz}(\dot{p} - qr) + (I_y - I_x)pq &= N_A \end{aligned} \quad (2)$$

$I_x$, $I_y$, $I_z$, $I_{xz}$ are the components of the inertia matrix and $L_A$, $M_A$, $N_A$ are the aerodynamical rolling, pitching and yawing moments respectively. The aerodynamical forces and moments acting on a fixed wing UAV can be modeled as follows:

$$F_{AD} = \frac{1}{2}\rho S V_a^2 \left(C_{D0} + C_{D_\alpha}\alpha + C_{D_{\alpha^2}}\alpha^2 + C_{D_{\beta^2}}\beta^2\right) \quad (3)$$

$$F_{AY} = \frac{1}{2}\rho S V_a^2 \left(C_{Y_\beta}\beta + C_{Y_p}\frac{pb}{2V_a} + C_{Y_r}\frac{rb}{2V_a}\right)$$

$$F_{AL} = \frac{1}{2}\rho S V_a^2 \left(C_{L0} + C_{L_\alpha}\alpha + C_{L_{\alpha^2}}\alpha^2 + C_{L_{\beta^2}}\beta^2 + C_{L_{\Delta E}}\Delta E + C_{L_q}\frac{qc}{2V_a}\right)$$

$$L_A = \frac{1}{2}\rho S b V_a^2 \left(C_{l_\beta}\beta + C_{l_{\Delta A}}\Delta A + C_{l_p}\frac{pb}{2V_a} + C_{l_r}\frac{rb}{2V_a}\right)$$

$$M_A = \frac{1}{2}\rho S c V_a^2 \left(C_{m0} + C_{m_\alpha}\alpha + C_{m_{\Delta E}}\Delta E + C_{m_q}\frac{qb}{2V_a}\right)$$

$$N_A = \frac{1}{2}\rho S b V_a^2 \left(C_{n_\beta}\beta + C_{n_p}\frac{pb}{2V_a} + C_{n_r}\frac{rb}{2V_a}\right)$$

where the $C_j$ are the aerodynamical model coefficients, $\rho$ is the air density, S is the wing area, b is the wing span, c is the mean chord of the wing and $\Delta A$ and $\Delta E$ are the directions of the ailerons and elevators respectively.

Problem Formulation

To estimate $\alpha$, $\beta$ and $V_a$ in real time, we express the non-linear model as an hybrid system in which the dynamics are linear in terms of $\alpha$ and $\beta$ in each mode. An analytical expression of the airspeed is computed offline in terms of measurements, control inputs, aircraft dimensional parameters and aerodynamic coefficients. UAV linear accelerations ax, ay, az and rotational rates gx, gy, gz noisy measurements are presented as random variables that are normally distributed. For each mode i, the linear 6-DOF system of equations can be written as $A_i x_i = b$, where $A_i$ is a 6×2 matrix which is mode dependent that contains the coefficients of $\alpha_i$ and $\beta_i$ for mode i, $x_i = [\alpha_i \beta_i]^T$ is a 2D vector that contains angle of attack and angle of sideslip and b is a 6×1 vector which is mode independent, it contains the measurements, control inputs, airframe parameters and other aerodynamical terms.

$$b = [b_1 \; b_2 \; b_3 \; b_4 \; b_5 \; b_6]^T \quad (4)$$

$$b_1 = \frac{2(F_X - F_{throttle} - F_{GX})}{\rho S V_a^2} - C_{D0} \quad (5)$$

$$b_2 = \frac{2(F_Y - F_{GY})}{\rho S V_a^2} - C_{Y_p}\frac{pb}{2V_a} - C_{Y_r}\frac{rb}{2V_a}$$

$$b_3 = \frac{2(F_Z - \tilde{F}_{GZ})}{\rho S V_a^2} C_{L0} - C_{L_{\Delta E}}\Delta E - C_{L_q}\frac{qc}{2V_a}$$

$$b_4 = \frac{2T_X}{\rho S V_a^2} - C_{l_{\Delta A}}\Delta A - C_{l_p}\frac{pb}{2V_a} - C_{l_r}\frac{rb}{2V_a}$$

$$b_5 = \frac{2(T_Y - T_{throttle})}{\rho S c V_a^2} - C_{m0} - C_{m_{\Delta E}}\Delta E - C_{m_q}\frac{qb}{2V_a}$$

$$b_6 = \frac{2T_Z}{\rho S b V_a^2} - C_{n_p}\frac{pb}{2V_a} - C_{n_r}\frac{rb}{2V_a}$$

$$A_s = \begin{bmatrix} C_{D\alpha i} & 0 & C_{L\alpha i} & 0 & C_{m\alpha} & 0 \\ C_{D\beta i} & C_{Y\beta} & C_{L\beta i} & C_{l\beta} & 0 & C_{n\beta} \end{bmatrix}^T \quad (6)$$

In the following section, we show how expressing the nonlinear model into multiple linear models and writing them. Since our test UAV does not have a rudder, we neglected the rudder input in this analysis, though adding it would not modify any of the results presented in this article. In the linear form equations (5, 6) allow for a very fast estimation process to be designed.

Estimation Method

In this section, we present the two estimation approaches introduced earlier, namely the LSQR approach and the Bayesian approach, along with the analytical solution formulation of the airspeed.

Airspeed Analytical Solution

As can be seen in equation (5), the angle of attack and sideslip cannot be directly estimated, since they depend upon the airspeed $V_a$. The analytical expression of the airspeed (in terms of the measurement data) is computed for each mode using the Symbolic math/Optimization toolbox of MATLAB. The least square solutions of $\alpha$ and $\beta$ are computed analytically (for each mode) as:

$$\begin{bmatrix} \alpha(V_a) \\ \beta(V_a) \end{bmatrix} = (A_i^T A_i)^{-1} A_i^T b(V_a) \quad (7)$$

$\alpha$ and $\beta$ are then substituted back into the nonlinear dynamical model. The explicit formula of $V_a$ is computed by minimizing the difference of the residuals (difference between the estimated and measured aerodynamical forces and torques) in the norm 2 sense:

$$N1 = F_{AX_{meas}} - F_X(V_a) - F_{GX} - F_{throttle}$$

$$N2 = F_{AY_{meas}} - F_Y(V_a) - F_{GY}$$

$$N3 = F_{AZ_{meas}} - F_{GZ}$$

$$N4 = T_{AX_{meas}} - T_X(V_a)$$

$$N5 = T_{AY_{meas}} - T_Y(V_a) - T_{Y_{throttle}}$$

$$N6 = T_{AZ_{meas}} - T_Z(V_a) \quad (8)$$

We thus solve the following unconstrained one dimensional optimization problem to obtain the airspeed:

$$N(V_a) = (N1^2 + N2^2 + N3^2 + N4^2 + N5^2 + N6^2)(V_a) \quad (9)$$

$$V_{analytic} = \arg\min_{V_a} N(V_a) \quad (10)$$

In the present case, the optimization problem can be solved analytically (for each mode), and the airspeed becomes a function of the inertial measurements, inputs (from the aileron, elevator and throttle) and aerodynamic model parameters.

$$V_{analytic} = f(ax, ay, az, p, q, r, \dot{p}, \quad (11)$$
$$\dot{q}, \dot{r}, \Delta A, \Delta E, \text{throttle}, C_{D\alpha i}, C_{D\beta i}, C_{L\alpha i}, C_{L\beta i})$$

Once this analytical expression is computed for each mode $V_{a_i}$, solving for angle of attack and sideslip boils down to solving a finite set of least squares problems $A_i x_i = b$.

Least Square Approach (LSQR)

In the least square approach, the estimation is done in four steps:

1. Compute airspeed (for each mode) by direct substitution in the analytic expression of $V_a$, equation (11)
2. Solve the least square problem to compute angle of attack and angle of sideslip (for each mode)
3. Mode selection to choose the estimates corresponding to the most likely mode (this determines the estimated $\alpha$ and $\beta$)
4. Update airspeed by minimizing residuals between the acceleration/angular acceleration data and the original nonlinear model (for the chosen $\alpha$, $\beta$)

Let i as an element of the set [1–k] denote the current mode index. At each time step t, the process of estimation is applied on all modes as follows. Measurements, aerodynamic coefficients, control inputs and model parameters are substituted in equation 11 to compute the airspeed $V_a(i)$ corresponding to each mode. Note that the linear aerodynamical coefficients $$\alpha \text{ and } \beta(C_{D\alpha i}, C_{L\alpha i}, C_{D\beta i}, C_{L\beta i}, C_{D_0 i_{lin}}, C_{L_0 i_{lin}})$$

are different for each mode.

For each mode, we substitute the computed airspeed $V_{a_i}$ into the linear model and write the problem of estimating $\alpha$ and $\beta$ as a standard linear system $A_i x_i = b$ where b is given by equation (5) which is mode independent and $A_i$ is the matrix (6), $x_i$ consists of the estimated $\alpha_i$ and $\beta_i$ associated with mode i. The matrix $M_i=(A_i^T A_i)^{-1} A_i^T$, can be pre-computed offline for every mode, since it is only a function of the UAV parameters. Therefore, the estimation of $\alpha_i$ and $\beta_i$ for each mode i boils down to the matrix multiplication of a pre-computed matrix with a vector that is fixed (for each time set).

The third step in the estimation process is the mode selection criteria. Three filtering stages are currently considered for the mode selection process:

1. The estimated angle of attack and sideslip are compared with corresponding domain of definition of the mode. The modes for which the estimated angle of attack and sideslip fall outside of the domain are not considered in the subsequent filtering stages.
2. To regularize the solution, we assume that the next estimates can only reside in the current mode domain or neighboring domains. This condition greatly smoothes the solution and prevents unreasonable jumps in the estimated parameters. We denote all estimates that violate this condition by $k_b$.
3. After applying the first two filtering stages, smaller number of estimates $k_c = k - k_a - k_b$ remain to identify the right mode. For each mode $i=1, \ldots, k_c$, we substitute the estimated airspeed $V_{ai}$, angle of attack $\alpha_i$ and angle of sideslip $\beta_i$ in the nonlinear aerodynamical model in equation (3) and the norms for forces and torques in equation (8) are computed. The selected estimates for the current time step $t_i$ is the one that correspond to the minimum norm.

The fourth and last step in estimation is to update the estimated airspeed. After identifying the right mode, the estimated $\alpha$ and $\beta$ are used in the nonlinear equations (3), the aerodynamical forces and torques are compared with the sensor data. Substituting all parameters and measurements in equations (1) and (2) produce a linear system in terms of the unknown $V_a$ and this system is solved to update the estimated airspeed. This implicitly assumes that the dynamics of the UAV are much slower than the frequency of update of the estimation process (herein: 10 Hz)

Bayesian Estimation

The parameters to be estimated using the Bayesian approach are random variables with a probability distribution, posterior distribution. An advantage of the Bayesian approach is that it considers the presence of noisy sensor measurements. We assume that the IMU measurements are noisy with normal distribution random variables representation $N(\mu, \sigma^2)$ with mean $\mu$ and standard deviation $\sigma$. Another advantage of the Bayesian approach over the classical methods is the flexibility in imposing prior information about the parameters to be estimated, prior distribution, it is combined with the data (measurements) to form the posterior distribution. Let $Pr(X)$ denote the prior distribution of the vector of estimated parameters X, $Pr(B|X)$ the conditional probability distribution of the probability for observing measurements if the parameters are known and $Pr(X|B)$ is the posterior probability of the estimated parameters and P(B) is the marginal likelihood [15]. Bayes' Theorem states that:

$$Pr(X|B) = \frac{Pr(B|X)Pr(X)}{Pr(B)} \quad (12)$$

The marginal likelihood is a normalizing constant, to insure that the integral of the posterior distribution is one. Sometimes it is not important to know the value of the marginal likelihood P(B) and equation (12) can be interpreted as $Pr(X|B) \propto Pr(B|X)Pr(X)$. We assume that the measurements and the estimated parameters follow normal distribution and to single out a specific solution from the posterior distribution, the maximum a posteriori (MAP) is selected.

Similar to the first approach, the estimation is done in four main steps, analytic computation of airspeed, Bayesian estimation of angle of attack and angle of sideslip, mode selection process and airspeed estimate update. We use a multivariate normal distribution (MVN) approach with the linear system AX=B as formulated in the last section to compute the posterior distribution of $\alpha$ and $\beta$ under the assumption of normally distributed measurements. Let $C_B$ be the measurements covariance matrix given by:

$$C_B = \text{diag}(\sigma_{ax}^2, \sigma_{ay}^2, \sigma_{az}^2, \sigma_{gx}^2, \sigma_{gy}^2, \sigma_{gz}^2) \quad (13)$$

under the assumption of independent IMU measurements. Assume that the estimated parameters $\alpha$ and $\beta$ are uncorrelated normally distributed random variables, $C_x$ is a 2×2 diagonal matrix with the variances of angle of attack and sideslip on its diagonal. $X=[\alpha \beta]^T$ is the estimated parameters vector. The prior is normally distributed and can be written as:

$$Pr(X) \propto e^{-\frac{1}{2}(X-X_{pr})^T C_X^{-1}(X-X_{pr})} \quad (14)$$

A good prior can be chosen to be the previous estimate of the parameters which makes sense if the estimation is executed at fast rate. The conditional probability distribution of the measurements given X is:

$$Pr(B|X) \propto e^{-\frac{1}{2}(AX-B)^T C_B^{-1}(AX-B)} \quad (15)$$

The posterior is the product of the prior and the conditional probability:

$$Pr(X|B) \propto e^{-\frac{1}{2}((AX-B)^T C_B^{-1}(AX-B)+(X-X_{pr})^T C_X^{-1}(X-X_{pr}))} \quad (16)$$

We are looking to minimize the negative of the exponent in equation (16). The covariance matrices $C_X^{-1}$ and $C_B^{-1}$ are positive definite matrices, hence we can compute the unique positive definite matrix square root. We formulate the optimization problem as:

$$\min \left(C_B^{-\frac{1}{2}}(AX-B)\right)^T \left(C_B^{-\frac{1}{2}}(AX-B)\right) + \\ \left(C_X^{-\frac{1}{2}}(X-X_{pr})\right)^T \left(C_X^{-\frac{1}{2}}(X-X_{pr})\right) \quad (17)$$

We solve the problem to find the posterior of the form:

$$Pr(X|B) \propto e^{-\frac{1}{2}(X-\overline{X})^T C_X'^{-1}(X-\overline{X})} \quad (18)$$

Where $\overline{X}$ is the mean values of current estimates and $C'_X$ is the covariance matrix of the posterior which is given by:

$$C'_X = (A^T C_B^{-1} A + C_X^{-1})^{-1} \qquad (19)$$

The mean yields the maximum likelihood solution under the assumption of normally distributed posterior [8].

$$\overline{X} = X_{pr} + C_X^{-1} A^T (A C_X^{-1} A^T + C_B^{-1})^{-1} (B - A X_{pr}) \qquad (20)$$

The normally distributed solution for α and β for each mode is given by:

$$X = R^T n + \overline{X} \qquad (21)$$

Where $R^T$ is found by Cholesky factorization of the posterior covariance matrix $C'_X = R^T R$, n consists of two independent normally distributed random numbers with zero mean and unity variance and $\overline{X}$ is the mean of the estimated variables.

The current estimated angle of attack α and sideslip β are used as a prior for the next sample. Unlike the least square approach, multiple samples are used to produce each estimate. The computation of the posterior covariance matrix and mean vectors (19) and (20) are as complex as the inversion of 2×2 matrices. Each estimation consists of multiple cycles (time samples), and for each cycle the estimates mean vector and covariance matrix are computed for each mode. A set of estimates $V_a$, α and β is generated every r cycles where each parameter is represented as a normally distributed random variables.

Mode Selection Process, selecting the right mode is done through three stages similar to the LSQR but defined differently. The first stage of filtering is to restrict the mean of estimate to be within the linear range that defines the mode. Next, we assume the change of estimation cannot be huge over r cycles and therefore the next estimation should reside in the neighborhood of the current estimation. Denote the mean of angle of attack α and the mean angle of sideslip by $\mu_\alpha$ and $\mu_\beta$ respectively and their standard deviations by $\sigma_\alpha$ and $\sigma_\beta$, the modes that do not satisfy equation (22) are excluded.

$$\mu_{\alpha_{i+1}} \in (\mu_{\alpha_i} - 2\sigma_{\alpha_i}, \mu_{\alpha_i} + 2\sigma_{\alpha_i}) \cap \mu_{\beta_{i+1}} \in (\mu_{\beta_i} - 2\sigma_{\beta_i}, \mu_{\beta_i} + 2\sigma_{\beta_i}) \qquad (22)$$

The mean of estimates of each of the remaining modes are substituted in the nonlinear aerodynamical model and the mode that corresponds to the minimum norm between the model and measurements of forces and torques is identified as the right mode. The airspeed estimate is updated as described earlier in LSQR except that α, β and sensor measurements are substituted in the model (3) as random variables. Under the assumption of normally distributed sensor measurements and estimates, one can show that the airspeed $V_a$ computed is also normally distributed.

Implementation and Validation
System Description

The system consists of an RC C-17 Globemaster airframe [4, 17]. Two embedded platforms from 3D Robotics are used in this study. An Aurdupilot Mega (APM) v2.6 connected to an inertial measurement unit (IMU), magnetometer, GPS, pressure sensor and ultrasound ground proximity sensor is used for the implementation of the LSQR approach. The execution of the algorithm is done onboard using the APM processor, an Atmel ATMEGA 2560 8-bit chip with a maximum frequency of 16 MHz and 256 KB cash memory [1].

Since the Bayesian estimation processed outlined earlier requires more computational resources, we used a Pixhawk platform connected to same suite of sensors as the APM with an additional airspeed sensor to validate the estimated airspeed. Pixhawk uses a 32-bit Cortex M4 processor running at 168 MHz with 256 KB RAM and 2 MB Flash. Both platforms use the open source system Arduplane for flight management.

Hardware-in-the-LOOP Simulation (HIL)

Figure 4:
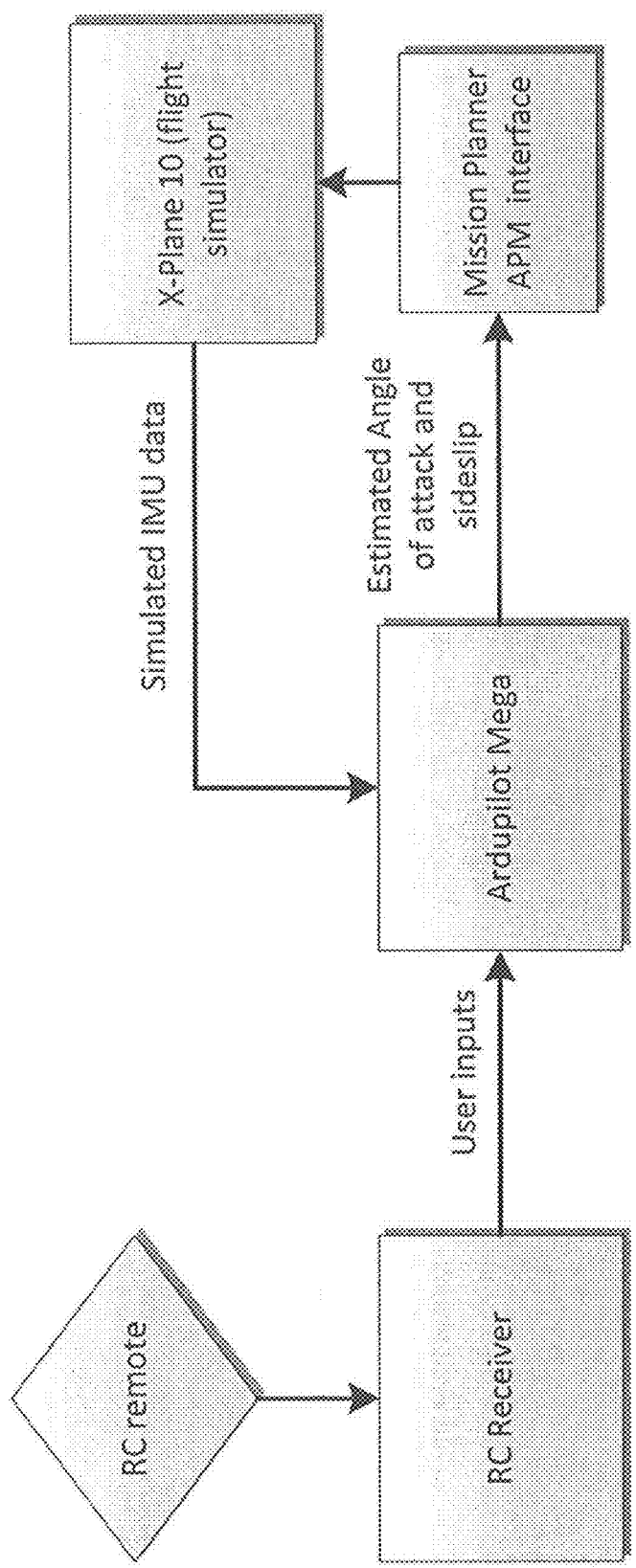
FIG. 4 depicts an exemplary Hardware in the loop (HIL) block diagram of the present disclosure.

FIG. 4 depicts a block diagram of an example setup of a Hardware-In-The-LOOP approach to verify the embodiments previously described above. To setup the HIL simulation environment, X-Plane, a commercial flight simulator, was used as the APM. To increase realism, we Gaussian noise was added to the simulated IMU measurements generated by X-Plane, in order to match the actual performance of the IMU. A UAV in X-Plane that matches the aerodynamic specifications, performance and weight distribution of a test UAV was created. The dynamics of α and β are decomposed into 15 different modes, 5 linear modes for angle of attack α (negative α, small α, large α, stall α and beyond stall α) and three modes of sideslip β, (negative β, β around zero and positive β). The air data estimation process is implemented in the fast loop that is executed at 50 Hz [19]. A customized version of APM Mission Planner (open source flight interface software) is used to interface the APM platform with X-Plane.

Figure 5:
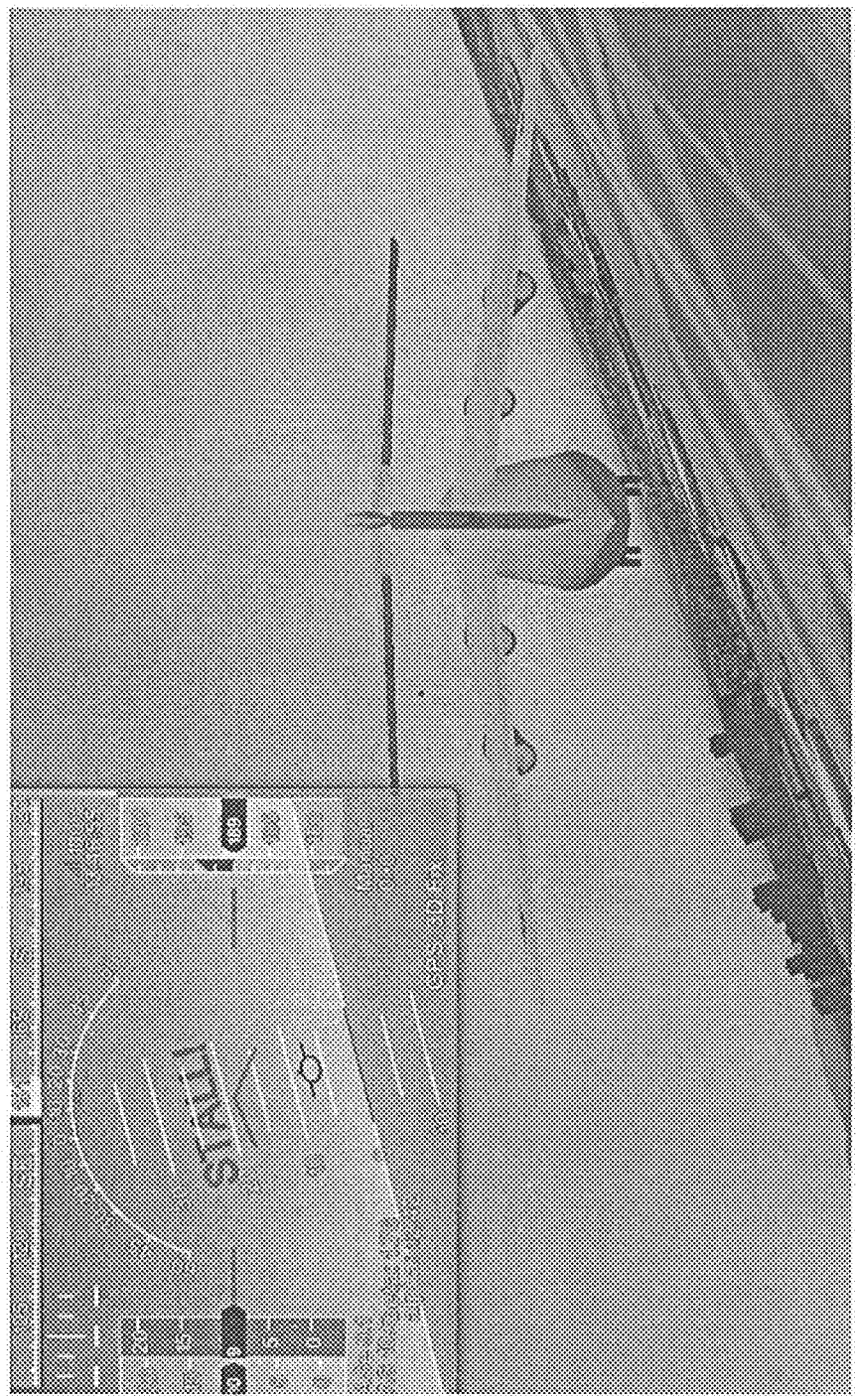
FIG. 5 depicts exemplary aerodynamic stall detection during a HIL manual flight test.
Figure 6:
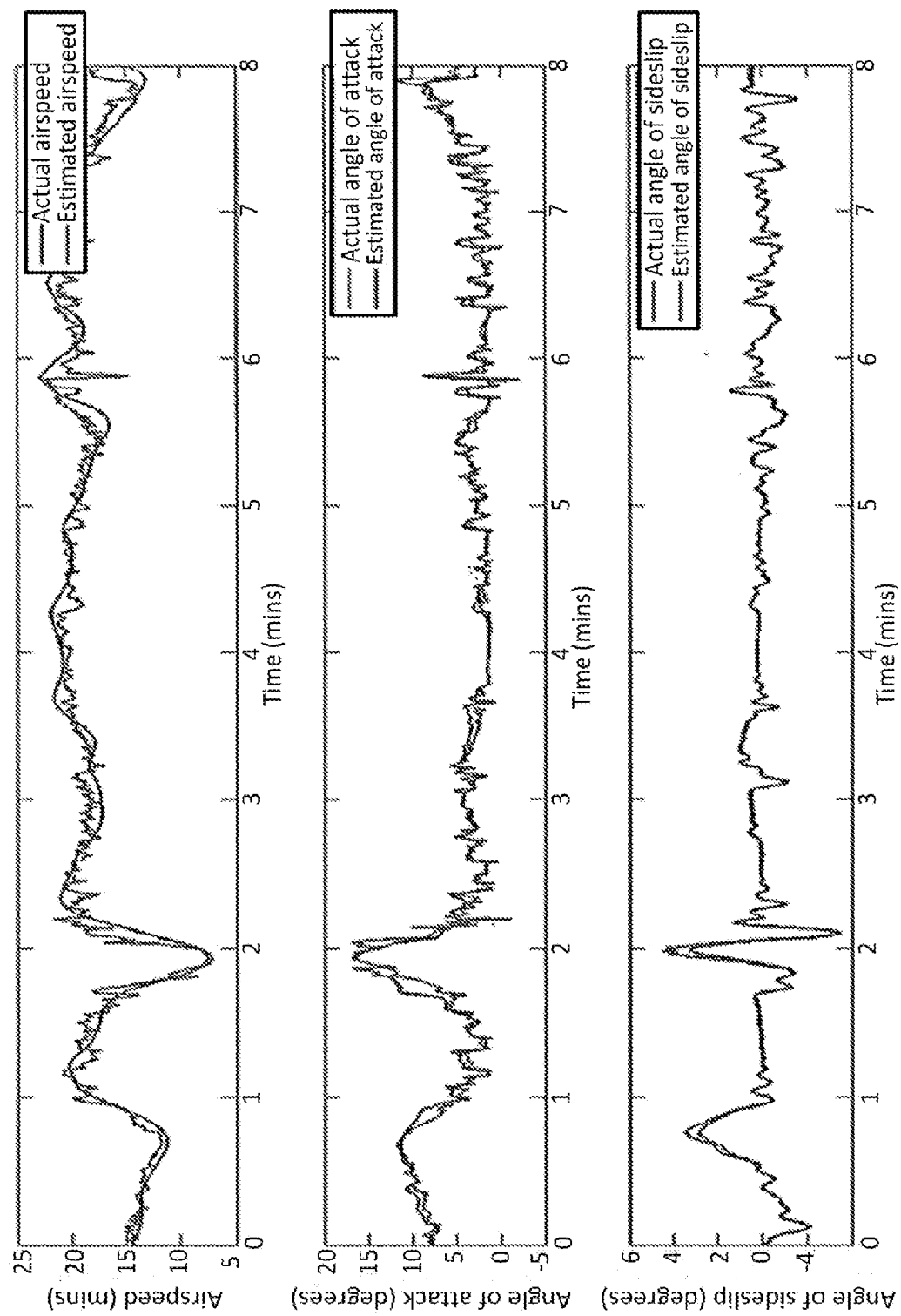
FIG. 6 depicts exemplary Hardware in the loop (HIL) simulation experiment results. The figure shows the estimates of Va, $\alpha$ and $\beta$ computed by the APM platform.

For the purpose of validation, the simulation is run in manual mode to voluntarily place the UAV in an aerodynamic stall. The stall angle of attack for our UAV is approximately 12 degrees from the aerodynamical analysis. As can be seen from FIG. 5, the stall event is detected by the estimation code running on the APM, and visualized on the customized mission planner (the original mission planner does not detect or report stalls). The performance of the least square approach is shown in FIG. 6, using HIL data. The least square approach implemented on APM yields good estimation of parameter with some minor fluctuations, which are caused by the random noise added to the simulated IMU measurements (the estimates are not altered or regularized, and are computed at every time step without any prior). The mean errors of the estimation of airspeed $V_a$, angle of attack α and sideslip β are 1:18 m/s, 1.04 degrees and 0.20 degrees respectively.

Experimental Flight Results

Figure 7:
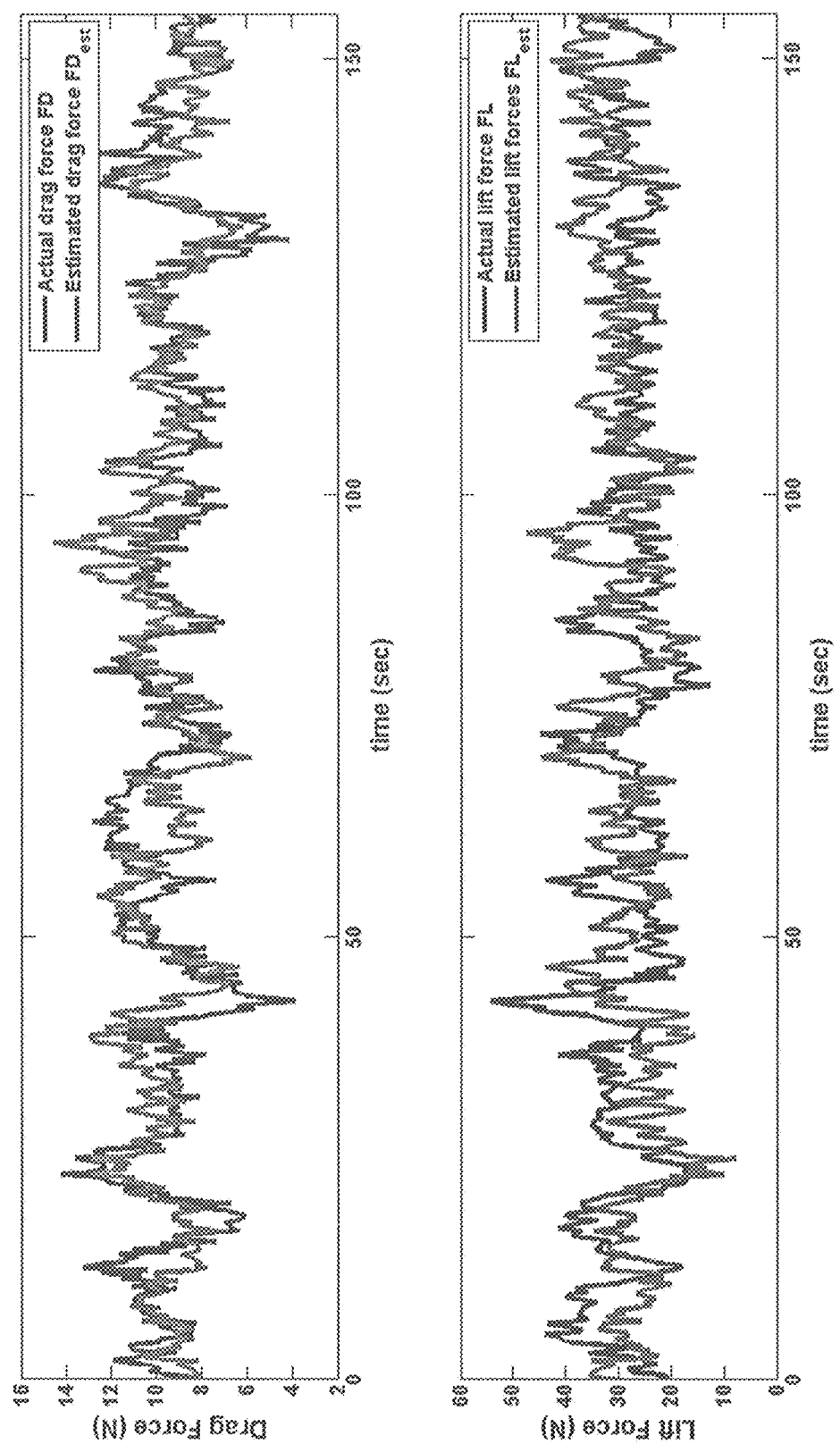
FIG. 7 depicts estimation results of the lift and drag forces during a UAV flight test.

The Bayesian approach is run on Pixhawk using experimental flight data generated on the RC C17 UAV. In contrast with the HIL simulation, the UAV is own by the APM autopilot running a modified version of the Arduplane code. In this experiment, the fast loop is run for reading the sensor data at 50 Hz, and the time horizon used for the Bayesian estimation is 5 time samples. So, the estimated air data parameters are generated at frequency of 10 Hz. As described in the previous section, most of the computations can be done offline before uploading the code to Pixhawk. Since the system is not equipped with air data system to measure $V_a$, α and β, the measured forces and torques (1, 2) generated by the IMU measurements are compared by substituting the estimated parameters aerodynamical forces and torques (3) into the dynamical model. The lift and drag forces are illustrated in FIG. 7. The Bayesian approach yields good estimation with the presence of sensor noise and disturbances caused for instance by the vibrations of the engines or the aerodynamic buffeting. The absolute mean relative errors for the estimation are 8%, 13% and 10% for the drag force, side force and lift force respectively. The error in the estimation of the rolling moment, pitching moment and yawing moment are 16%, 9% and 6% respectively. Platforms with higher sensor accuracy and lower noise would improve the results of estimation. Another factor to improve the accuracy of estimation is running the estimation at higher frequency which requires more computational power and faster sensor data update rate.

As will be apparent to those of skill in the art upon reading this disclosure, each of the individual embodiments described and illustrated has discrete components and features which may be readily separated from or combined with the features of any of the other several embodiments without departing from the scope or spirit of the present disclosure. Any recited method can be carried out in the order of events recited or in any other order logically possible.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCES

[1] 3D Robotics Inc., 3drobotics.com.
[4] M. Abdelkader, M. Shaqura, C. G. Claudel, and W. Gueaieb. A uav based system for real time flash flood monitoring in desert environments using lagrangian microsensors. In *International Conference on Unmanned Aircraft Systems, ICUAS 2013-Conference Proceedings*, pages 25-34.
[5] Evan Ackerman. Japan earthquake: Global hawk uav may be able to peek inside damaged reactors. *IEEE Spectrum*, 17, 2011.
[6] S Adams, C Friedland, and M Levitan. Unmanned aerial vehicle data acquisition for damage assessment in hurricane events. In *Proceedings of the 8th International Workshop on Remote Sensing for Disaster Management*, Tokyo, Japan, volume 30.
[7] Stuart M Adams and Carol J Friedland. A survey of unmanned aerial vehicle (uav) usage for imagery collection in disaster research and management. In *9th International Workshop on Remote Sensing for Disaster Response*.
[8] Richard C Aster, Brian Borchers, and Clifford H Thurber. *Parameter estimation and inverse problems*. Academic Press, 2013.
[9] M Z Fekri and M Mobed. Angle of attack estimation and aircraft controller design using lqr methods. In *Canadian Conference on Electrical and Computer Engineering*, 2005, pages 2253-2256. IEEE.
[10] Anastasis Georgoulas, Allan Clark, Andrea Ocone, Stephen Gilmore, and Guido anguinetti. A subsystems approach for parameter estimation of ode models of hybrid systems. *arXiv preprint arXiv:1208.3850*, 2012.
[11] Mehdi Ghommem, Victor M Calo, and Christian G Claudel. Micro-cantilever flow sensor for small aircraft. *Journal of Vibration and Control*, 2013.
[12] Aleksandar Lj Juloski, Siep Weiland, and W. P. M. H Heemels. A bayesian approach to identification of hybrid systems. *IEEE Transactions on Automatic Control*, 50(10):1520-1533, 2005.
[13] Xenofon Koutsoukos, James Kurien, and Feng Zhao. Monitoring and diagnosis of hybrid systems using particle filtering methods. In *International Symposium on Mathematical Theory of Networks and Systems*, 2002.
[14] Xenofon Koutsoukos, James Kurien, and Feng Zhao. Estimation of distributed hybrid systems using particle filtering methods. In *Hybrid Systems: Computation and Control*, pages 298-313. Springer, 2003.
[15] Alberto Leon-Garcia. *Probability, Statistics and Random processes for electrical engineering*. Prentice Hall, 2008.
[16] F Adhika Pradipta Lie and Demoz Gebre-Egziabher. Synthetic air data system. *Journal of Aircraft*, 50(4):1234-1249, 2013.
[17] M. Ghommem N. Collier V. Calo C. Claudel M. Abdelkader, M. Shaqura. Optimal multi-agent path planning for fast inverse modeling in uav-based flood sensing applications. In *International Conference on Unmanned Aircraft Systems (ICUAS)*, 2014, pages 64-71. IEEE.
[18] Eugene A Morelli. Real-time aerodynamic parameter estimation without air flow angle measurements. *Journal of Aircraft*, 49(4):1064-1074, 2012.
[19] M. Shaqura and C. Claudel. A hybrid system approach to air data estimation in unmanned aerial vehicles. In *Real-Time and Embedded Technology and Applications Symposium, WiP* 2014. IEEE.
[20] N Shantha Kumar and G Girija. Filtering and fusion based reconstruction of angle of attack. *National Conference on Range Technology (NACORT)*, 2006.

The invention claimed is:

1. An aeronautical system, comprising:
  an inertial measurement unit (IMU) attached to an unmanned aerial vehicle (UAV);
  a computing device in data communication with the IMU;
  an application executable by the computing device, wherein the application comprises:
    logic that estimates an angle of attack of the UAV based at least in part on data received from the IMU;
    logic that estimates a slip angle of the UAV based at least in part on the data received from the IMU;
    logic that estimates a speed of the UAV based at least in part on the data received from the UAV, wherein the speed comprises an estimated ground velocity of the UAV, and
    logic that synthesizes a flight path vector from the estimated ground velocity.

2. The system of claim 1, wherein the speed of the UAV further comprises at least one of an estimated airspeed of the UAV and an estimated vertical speed of the UAV.

3. The system of claim 1, wherein the application further comprises logic that causes one or more of the estimated angle of attack, the estimated slip angle, or the estimated speed to be rendered within a user interface displayed to a pilot of the UAV.

4. The system of claim 1, wherein the application estimates at least one of the angle of attack, the slip angle, or the speed using a least mean squares approach.

5. The system of claim 1, wherein the application estimates at least one of the angle of attack, the slip angle, or the speed using a Bayesian filter approach.

6. A method, comprising:
  estimating, via a computing device, flight data of an unmanned aerial vehicle (UAV) based at least in part on data received by the computing device from an inertial measurement unit (IMU);
  comparing, via the computing device, the estimated flight data of the UAV with measured flight data of the UAV to determine whether the measured flight data of the UAV is within a predefined deviation of the estimated flight data of the UAV, wherein the measured flight data is reported by a dedicated sensor; and triggering, via the computing device, an error indication in response to a determination that the measured flight data of the UAV exceeds a predefined deviation of the estimated flight data of the UAV.

7. The method of claim 6, wherein the estimated flight data comprises at least one of an angle of attack of the UAV, a slip angle of the UAV, or a speed of the UAV.

8. The method of claim 6, wherein the estimated flight data comprised a speed of the UAV wherein the speed of the UAV is at least one of an estimated airspeed of the UAV, an estimated vertical speed of the UAV, or an estimated ground velocity of the UAV.

9. The method of claim 6, wherein the estimated flight data includes an estimated ground velocity of the UAV and the method further synthesizes a flight path vector from the estimated ground velocity.

10. The method of claim 9, wherein the step of triggering includes triggering, via the computing device, an error indication in response to a determination that the synthesized flight path vector constitutes a deviation from a predetermined flight path vector.

11. The method of claim 6, wherein the estimated flight data is estimated using a least mean squares approach.

12. The method of claim 6, wherein the estimated flight data is estimated using a Bayesian filter approach.

13. The method of claim 6, wherein the IMU includes an accelerometer and a gyroscope, and the method includes generating IMU data, via the accelerometer and the gyroscope, and the data received by the computing device includes IMU data generated via the accelerometer and the gyroscope.

14. An aeronautical system, comprising:
an inertial measurement unit (IMU) attached to an unmanned aerial vehicle (UAV), the IMU including an accelerometer and a gyroscope for generating data;
a computing device in data communication with the IMU;
an application executable by the computing device, wherein the application comprises:
logic that estimates an angle of attack of the UAV based at least in part on data received from the IMU generated by the accelerometer and the gyroscope;
logic that estimates a slip angle of the UAV based at least in part on the data received from the IMU; and
logic that estimates a speed of the UAV based at least in part on the data received from the UAV.

15. The system of claim 14, wherein the application estimates at least one of the angle of attack, the slip angle, or the speed using a least mean squares approach or a Bayesian filter approach.

16. The system of claim 14, wherein the speed of the UAV is at least one of an estimated airspeed of the UAV, an estimated vertical speed of the UAV, or an estimated ground velocity of the UAV.

17. The system of claim 14, wherein the application further comprises logic that causes one or more of the estimated angle of attack, the estimated slip angle, or the estimated speed to be rendered within a user interface displayed to a pilot of the UAV.

18. The system of claim 14, wherein the application estimates at least one of the angle of attack, the slip angle, or the speed using a least mean squares approach.

19. The system of claim 14, wherein the application estimates at least one of the angle of attack, the slip angle, or the speed using a Bayesian filter approach.

20. The system of claim 14, wherein the application further comprises logic that estimates a ground velocity of the UAV and synthesizes a flight path vector from the estimated ground velocity.

\* \* \* \* \*